United States Patent [19]
von Hagen et al.

[11] Patent Number: 5,256,219
[45] Date of Patent: Oct. 26, 1993

[54] STEEL REINFORCEMENT TUBE

[75] Inventors: Ingo von Hagen, Krefeld; Christoph Prasser, Essen; Enno Wieting, Ratingen, all of Fed. Rep. of Germany

[73] Assignee: Mannesmann Aktiengesellschaft, Düsseldorf, Fed. Rep. of Germany

[21] Appl. No.: 878,719

[22] Filed: May 4, 1992

Related U.S. Application Data

[63] Continuation-in-part of Ser. No. 602,514, Oct. 24, 1990, abandoned.

[51] Int. Cl.$^5$ .................. C22C 38/14; B60J 5/04
[52] U.S. Cl. .................. 148/909; 420/120; 148/330; 138/177; 296/188
[58] Field of Search ............... 420/120; 148/909, 320, 148/330; 138/177; 49/502; 296/188, 146 C

[56] References Cited

U.S. PATENT DOCUMENTS

| | | | |
|---|---|---|---|
| Re. 28,523 | 8/1975 | Hill et al. | 420/119 |
| 3,635,698 | 1/1972 | Heuschkel | 420/119 |
| 3,983,030 | 9/1976 | Rosynek et al. | 208/253 |
| 4,090,734 | 5/1978 | Inami et al. | 296/146 |
| 4,144,058 | 3/1979 | Chen et al. | 148/304 |
| 4,152,148 | 5/1979 | Machmeier | 420/107 |
| 4,260,416 | 4/1981 | Kavesh et al. | 148/304 |
| 4,299,621 | 11/1981 | Giflo | 420/119 |
| 4,358,361 | 11/1982 | Peters | 208/89 |
| 4,370,178 | 1/1983 | Waid et al. | 148/12 |
| 4,444,818 | 4/1984 | Tominaga et al. | 428/36 |
| 4,508,615 | 4/1985 | Oleck et al. | 208/89 |
| 4,510,043 | 4/1985 | Oleck et al. | 208/97 |
| 4,685,722 | 8/1987 | Srock | 296/188 |
| 4,702,040 | 10/1987 | Hellriegel | 49/502 |
| 4,784,704 | 11/1988 | Manton | 148/334 |
| 4,796,946 | 1/1989 | Wilson et al. | 296/146 |
| 4,802,918 | 2/1989 | Ooki et al. | 75/10.61 |
| 4,866,883 | 9/1989 | Brown et al. | 49/502 |
| 4,929,473 | 5/1990 | Marquez et al. | 427/252 |
| 4,978,562 | 12/1990 | Wycech | 428/35.8 |

FOREIGN PATENT DOCUMENTS

| | | | |
|---|---|---|---|
| 3728476 | 8/1987 | Fed. Rep. of Germany . | |
| 1591687 | 6/1970 | France | 420/120 |
| 123178 | 1/1959 | U.S.S.R. | 420/120 |

*Primary Examiner*—Deborah Yee
*Attorney, Agent, or Firm*—Nils H. Ljungman & Associates

[57] ABSTRACT

An economical steel for a reinforcement tube which steel meets the minimum requirements for reinforcement tubes, has a composition as follows: 0.15–0.25 % Carbon, 3.40–6.10 % Manganese, 0–1.0 % Nickel, 0–1.0 % Chromium, 0–1.0 % Molybdenum, 0–0.15 % Vanadium, max. 0.03 % Phosphorous, max. 0.03 % Sulfur, max. 0.6 % Silicon, max. 0.05 % Aluminum, with the remainder being iron and usual impurities, such that the sum total of the content of manganese, nickel, chromium, molybdenum and ten times the content of vanadium equals at least 4.5 wt. %.

7 Claims, 3 Drawing Sheets

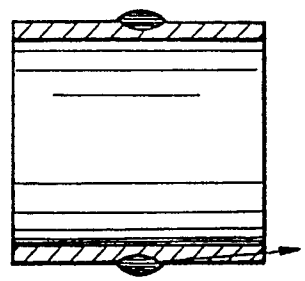
FIG. 1a
FIG. 1b
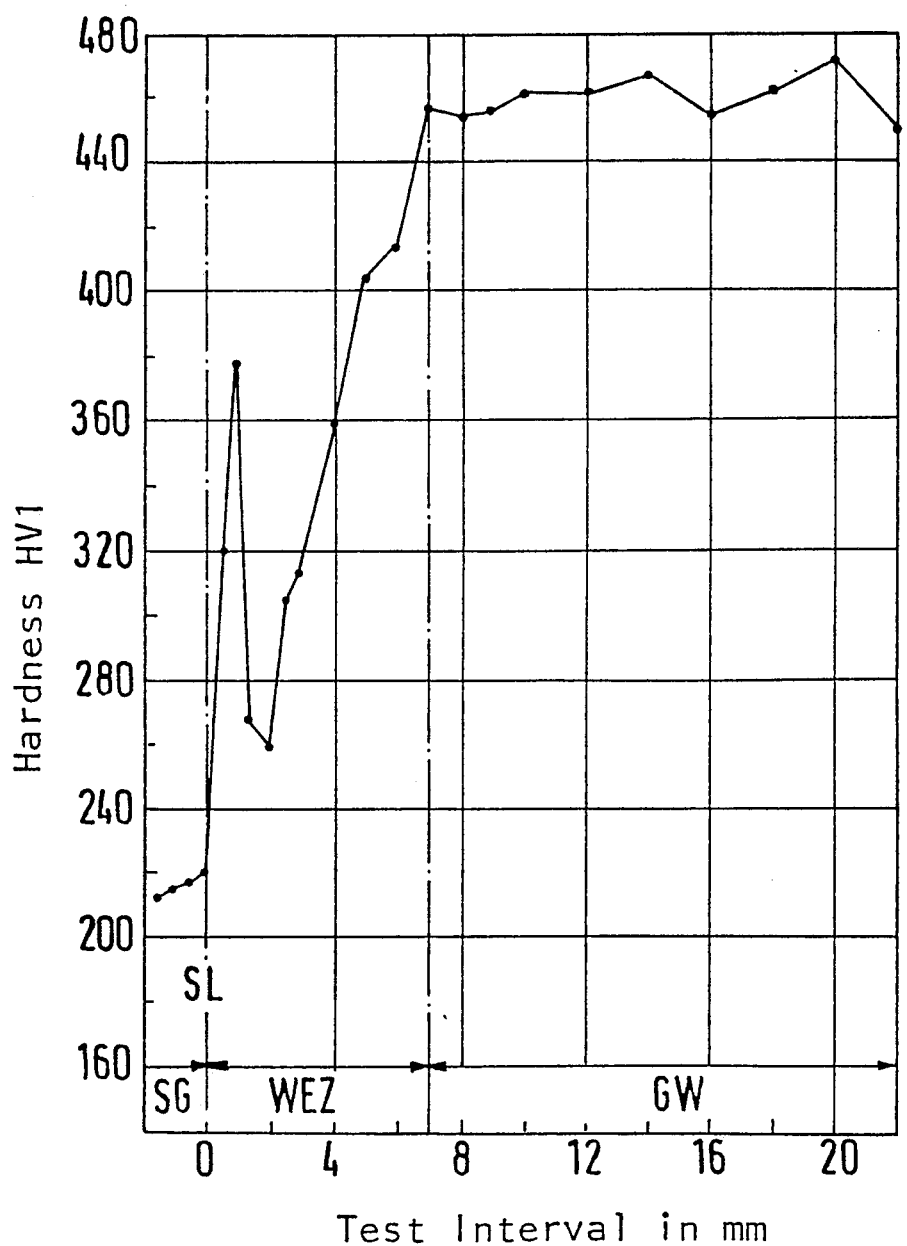
Test Interval in mm

STEEL REINFORCEMENT TUBE

CROSS REFERENCE TO RELATED APPLICATION

This application is a continuation-in-part of application Ser. No. 07/602,514, now abandoned. Application Ser. No. 07/602,514, entitled "Motor Vehicle Door Having a Reinforcement Tube, and the Reinforcement Tube Therefor", was filed Oct. 24, 1990, in the name of Ingo Von Hagen, et al., the inventors herein, and was assigned to the assignee of the present invention.

BACKGROUND OF THE INVENTION

1. Field of the Invention

This invention relates to an economical steel for being used to manufacture a reinforcement tube and the reinforcement tube manufactured from the steel.

2. Background Information

Steel reinforcement elements are typically installed to provide added strength to the door and provide passenger protection against lateral collision accidents involving motor vehicles. Various types of reinforcement elements have been used.

One type of steel reinforcement element is described in U.S. Pat. No. 4,090,734 to Inami et al. The reinforcement element of Inami et al. is in the form of a central piece formed from a plate of high tensile strength steel and two end pieces of a mild steel that is the same steel as the steel of which the door inner panel is made. The pieces of the reinforcement element of Inami et al. are given added strength by cross-sectional undulations which run the length of the pieces. The central reinforcement element is welded to the end pieces, which are then welded into a vehicle door.

One alternative type of reinforcement element is a tubular steel reinforcement element. The steel tubes used for the manufacture of tubular reinforcement elements must satisfy certain minimum requirements regarding strength, toughness and workability if they are to perform their task of absorbing as much of the impact energy as possible. For example, the following values, as a function of the size of the profile, must be achieved under specified test conditions:

| Tensile strength | ($R_m$) | at least - 1100 N/mm$^2$ |
| Yield strength | ($R_t$) | at least - 800 N/mm$^2$ |
| Elongation at fracture | ($A_5$) | at least - 8% |
| Work of deformation | ($W_{150}$) | at least - 1900 Joule |

Such reinforcement tubes are conventionally manufactured by hot deformation, and the required strength of is achieved by water hardening. A steel of the prior art, for example, may contain 0.18% carbon, 0.4% silicon and 1.14% manganese, with the remainder being iron and usual impurities.

When the reinforcement tubes are processed for use in a vehicle, they are frequently subjected to treatments and processes which can have a significantly adverse effect on the original characteristics of the metal, such as those listed above. Examples of such processes are welding processes which, in conventional steels, generally lead to negative changes in characteristics in the heat-affected zone, and the subsequent galvanizing of a door structure for purposes of corrosion protection. In particular, hot dip galvanizing can be conducted at temperatures of up to approximately 500 degrees C. Subjecting the tubes to such temperatures represents a tempering treatment, which is in itself undesirable. For the reinforcement tubes which are in the hardened state, the tempering caused by the hot dip galvanizing is connected with the disadvantage of a corresponding loss of strength.

DE 37 28 476 Cl discloses the use of a steel alloy as a material for the manufacture of reinforcement tubes. The steel alloy disclosed has the following composition: (in weight percent, wt %)

| max. 0.35% | Carbon |
| max. 0.50% | Silicon |
| max. 1.8% | Manganese |
| max. 0.030% | Phosphorous |
| max. 0.030% | Sulfur |
| 0–1.5% | Nickel |
| 1.8–2.2% | Chromium |
| 0.4–0.7% | Molybdenum |
| 0.025–0.050% | Aluminum |

Remainder iron and usual impurities.

The manufacture of the tubes by hot rolling is thereby carried out with the proviso that the final rolling temperature must be between 980 and 1080 degrees C. Since the steel is air-hardened, the above-mentioned minimum values of the manufactured tubes can be satisfied without the additional requirements of a complex and expensive heat treatment process. Nothing in DE 37 28 476 Cl discloses anything about a change of the material properties caused by hot dip galvanizing. One disadvantage of the alloy described therein is that expensive alloy elements such as Chromium, Nickel and Molybdenum must be used in rather large quantities, and thus, the increasing material costs, at least to some extent, offset the savings represented by the elimination of the heat treatment.

OBJECT OF THE INVENTION

An object of the invention is to propose a steel as a material for the manufacture of reinforcement tubes, so that, not only are the specified minimum characteristics of the hot-rolled tube guaranteed, but these minimum characteristics are retained even after welding and hot dip galvanizing. It is also an object of the invention to manufacture the tubes as economically as possible.

SUMMARY OF THE INVENTION

These objects are achieved by means of the invention by the use of a steel having the alloy composition (in weight percent, wt. %) indicated below:

| 0.15–0.25% | Carbon |
| 3.40–6.10% | Manganese |
| 0–1.0% | Nickel |
| 0–1.0% | Chromium |
| 0–1.0% | Molybdenum |
| 0–0.15% | Vanadium |
| max. 0.03% | Phosphorous |
| max. 0.03% | Sulfur |
| max. 0.6% | Silicon |
| max. 0.05% | Aluminum |

Such a steel has a composition in which the total contents of manganese, nickel, chromium, molybdenum and ten times the content of vanadium equals at least 4.5 wt. %. To increase the toughness or strength properties, an advantageous refinement of the invention calls for the addition of titanium and boron to this alloy so that the titanium content is, beyond the expected loss by burning, at least 3.4 times the concentration of nitrogen, and the boron content is in the range of 0.001-0.005 wt. % boron. The purpose of the addition of titanium is to bond the N-content to release the full effect of the boron. The nitrogen-content is always present and can be estimated on the basis of experience and as a function of the smelting technology used (for smelting weldable steels, the customary value is approximately 50-70 ppm N). Generally, it is not appropriate to go significantly beyond the titanium: nitrogen ratio of 3.4:1.

One aspect of the invention resides broadly in a steel for a reinforcement tube for a motor vehicle door, the steel comprising iron and the following elements:

| | |
|---|---|
| 0.15-0.25% | Carbon |
| 3.40-6.10% | Manganese |
| 0-1.0% | Nickel |
| 0-1.0% | Chromium |
| 0-1.0% | Molybdenum |
| 0-0.15% | Vanadium |
| max. 0.03% | Phosphorous |
| max. 0.03% | Sulfur |
| max. 0.6% | Silicon |
| max. 0.05% | Aluminum | such that a sum total of the content of manganese, nickel, chromium and molybdenum, and ten times the vanadium content is greater than about 4.5 wt. % of the total percent of constituents of said alloy.

Another aspect of the invention resides broadly in a reinforcement tube for a motor vehicle door, the reinforcement tube comprising a fully killed, steel alloy, the steel comprising iron and the following elements:

| | |
|---|---|
| 0.15-0.25% | Carbon |
| 3.40-6.10% | Manganese |
| 0-1.0% | Nickel |
| 0-1.0% | Chromium |
| 0-1.0% | Molybdenum |
| 0-0.15% | Vanadium |
| max. 0.03% | Phosphorous |
| max. 0.03% | Sulfur |
| max. 0.6% | Silicon |
| max. 0.05% | Aluminum | such that a sum total of the content of manganese, nickel, chromium and molybdenum, and ten time the vanadium content is greater than about 4.5 wt. % of the total percent of constituents of said alloy.

BRIEF DESCRIPTION OF THE DRAWINGS

FIG. 1a is a longitudinal cross-section of a tube and test weld as evaluated in FIG. 1b.

FIG. 1b is a graph showing the hardness curve of a conventional water-hardened steel tube as shown in FIG. 1a.

FIG. 2b is a graph showing the hardness curve of the steel of the present invention in a steel sheet as shown in FIG. 2a.

DESCRIPTION OF THE PREFERRED EMBODIMENTS

The steel used in accordance with the present invention is characterized in particular by a comparatively high content of manganese (Mn), which represents a relatively economical alloy element. The expensive alloy elements nickel (Ni), molybdenum (Mo), vanadium (V) and chromium (Cr) can be eliminated completely, or at least the proportions of these elements can be drastically reduced. A pre-requisite for this is that the following equation be satisfied:

$Mn + Ni + Cr + Mo + 1033\ V$ is greater than or equal to 4.5 wt. %.

If desired, satisfaction of this equation can even be guaranteed merely by an Mn content of at least 4.5 wt. %. Since the steel according to the invention hardens in air, as does the steel of the prior art disclosed in DE 37 28 476 Cl, expensive heat treatment measures to achieve the specified technological properties can be eliminated, and thus, its use for the manufacture of motor vehicle door reinforcement tubes also has significant economic advantages. The tubes manufactured from this material, after a tempering at approximately 500 degrees C., exhibited only a fraction of the strength loss and decrease of the workability in comparison with conventional water-hardened materials. Thus, door reinforcement tubes made of this material can be routinely subjected to hot dip galvanizing to improve corrosion protection, and they can even be welded without unacceptable reductions of the strength properties.

Examples of alloys which can be used according to the invention are indicated in the following table (in wt. %):

| C | Si | Mn | P | S | Al$_{tot}$ | Cr | Mo | V |
|---|---|---|---|---|---|---|---|---|
| 0.19 | 0.62 | 3.95 | 0.008 | 0.0030 | 0.037 | 0.63 | 0.30 | 0.000 |
| 0.19 | 0.59 | 4.02 | 0.009 | 0.0025 | 0.037 | 0.57 | 0.29 | 0.000 |
| 0.19 | 0.34 | 4.05 | 0.009 | 0.0026 | 0.031 | 0.57 | 0.02 | 0.049 |
| 0.19 | 0.33 | 4.00 | 0.007 | 0.0019 | 0.029 | 0.55 | 0.02 | 0.051 |

Wherein, C=carbon, Si=silicon, Mn=manganese, P=phosphorous, S=sulfur, Al=aluminum, Cr=chromium, Mo=molybdenum and V=vanadium.

The positive behavior of the steel according to the invention with regard to changes in material characteristics resulting from a welding process is apparent from the comparison of hardness curves measured on test pieces, as shown in FIGS. 1a, 1b and 2a, 2b.

FIG. 1b shows the hardness curve on a section of tube, as shown in FIG. 1a, 38 mm in diameter having a wall thickness of 2.3 mm made from a conventional water-hardened steel with 0.18% carbon, 0.4% silicon and 1.14 manganese with the remainder consisting of iron and usual impurities, on which a test weld was made using the MIG process. In the unaffected base material (GW), the HV1 hardness has values of 460, while in the heat-affected zone (WEZ), it drops to values as low as 260. The HV1 hardness of the weld filler metal (SG) is approximately 220, but that is irrelevant in this context, since that value is a function only of the material of the welding electrode used.

Figure 2A:
FIG. 2a is a cross-section of a steel sheet and test weld as evaluated in FIG. 2b.
Figure 2B:
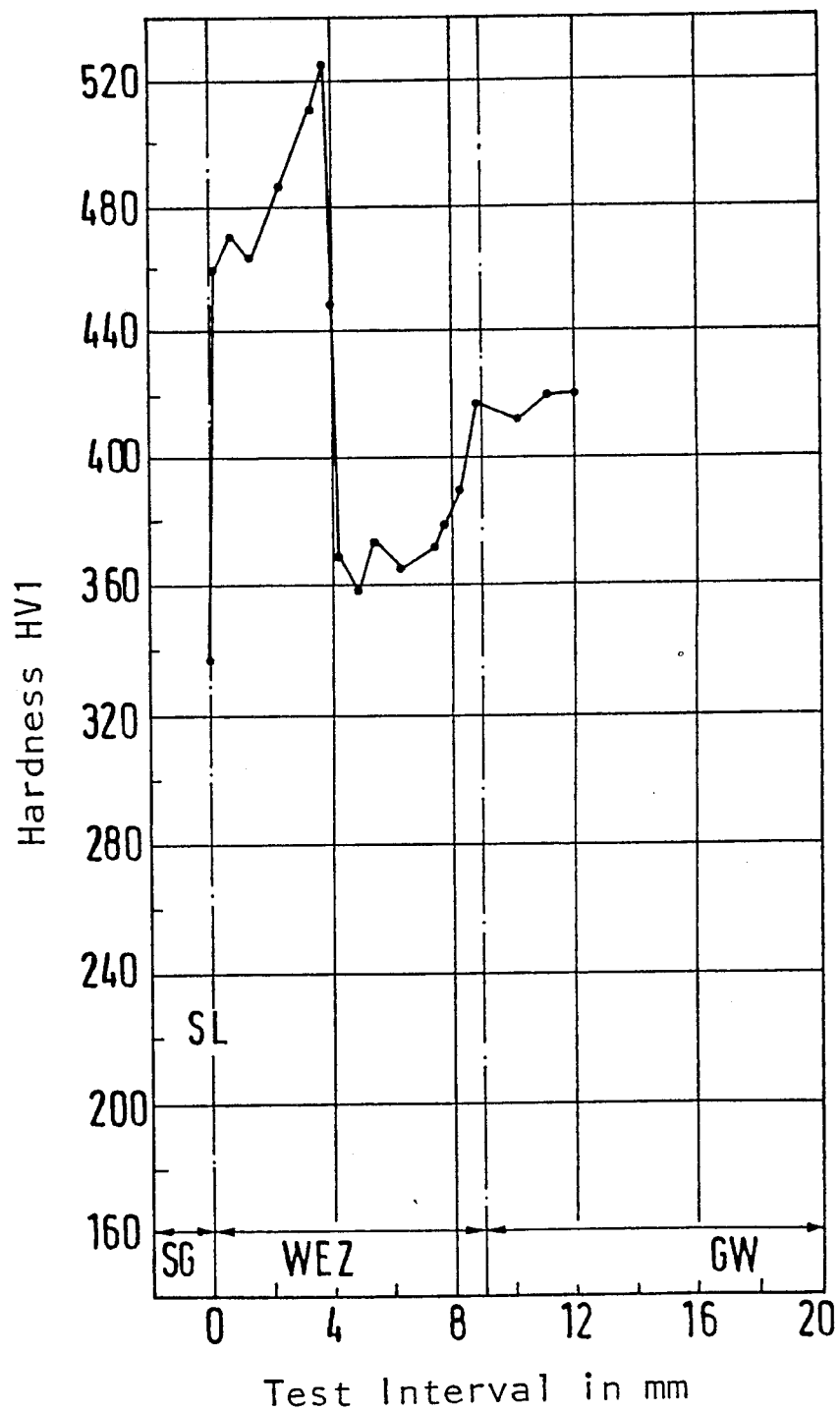

On the other hand, a test sheet, as shown in FIG. 2a, 5 mm thick of an air-hardened steel in accordance with the invention containing 0.19% carbon, 3.95% manganese and 0.6% chromium with the remainder consisting of iron and usual impurities, gave significantly better results with a test weld using the TIG process and a filler metal different from that used in the comparative test, as shown in FIG. 2b. Although the heat-affected zone, which is approximately 9 mm, is even somewhat wider than the 7 mm value of the comparative example, the HV1 hardness here only drops from values near 420 in the unaffected base material to values around 360 in the heat-affected zone. Thus, the hardness value of the steel of the current invention is higher than the value in the first test of a conventional steel by approximately 100.

The behavior of the same materials as were used in the tests illustrated in FIGS. 1a, 1b and FIGS. 2a, 2b was also tested with regard to tempering. For this purpose, comparative tests were conducted on specimen tubes having the dimensions 30×3.2 mm, in other words, 30 mm in diameter with a 3.2 mm wall thickness, which had been manufactured in the conventional manner by hot rolling followed by water-hardening or air hardening.

Figure 3:
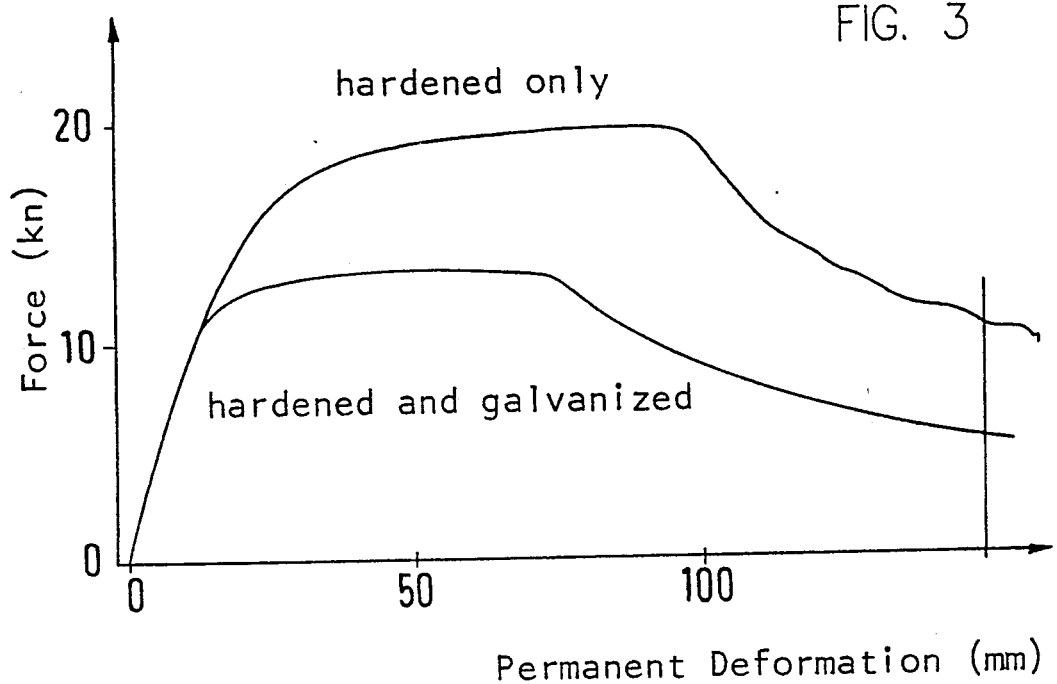
FIG. 3 is a graph showing the force needed to permanently deform a conventional water-hardened steel.
Figure 4:
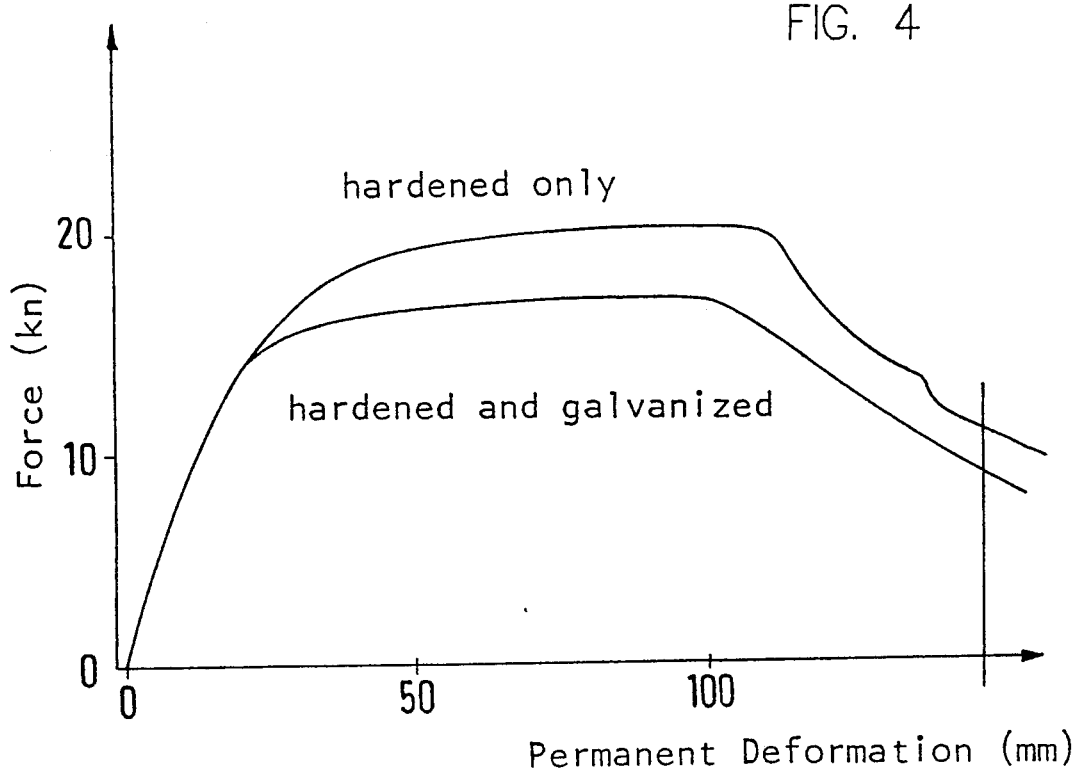
FIG. 4 is a graph showing the force needed to permanently deform the steel of the present invention.

The top curve in FIG. 3 shows the curve of the force over the permanent deformation of a tube test piece made of water-hardened steel, where the test was performed according to the test conditions specified for door reinforcement tubes. The area under the curve is a measure of the workability of this tube segment. The lower curve is the curve of the force for an identical tube which had previously been subjected to a tempering treatment by hot dip galvanizing at approximately 500 degrees C. As a result of the significantly lower bending forces, there is a decrease of the workability in the range of permanent deformation in question by approximately 40%. A corresponding comparison curve for an air-hardened tube segment and an air-hardened tube segment which had been tempered by hot dip galvanizing at approximately 500 degrees C., is shown in FIG. 4. The better behavior of this material is apparent, since the lower curve lies significantly closer to the upper curve. Accordingly, the loss of workability as a result of the hot dip galvanizing is only approximately 15% compared to the original hardened state. Thus, the specified minimum value of the workability as well as the other required characteristics for door reinforcement tubes can be easily achieved.

In summary, one feature of the invention resides broadly in the use of a fully-killed, cast steel, consisting of:

| | |
|---|---|
| 0.15–0.25% | Carbon |
| 3.40–6.10% | Manganese |
| 0–1.0% | Nickel |
| 0–1.0% | Chromium |
| 0–1.0% | Molybdenum |
| 0–0.15% | Vanadium |
| max. 0.03% | Phosphorous |
| max. 0.03% | Sulfur |
| max. 0.6% | Silicon |
| max. 0.05% | Aluminum |

Remainder iron and usual impurities as material for the manufacture of tubes for the reinforcement of motor vehicle doors, characterized by the fact that the following equation for the sum of the alloy elements (in wt. %) is satisfied:

Mn+Ni+Cr+Mo+10×V is greater than or equal to 4.5 wt. %

Another feature of the invention resides broadly in the use of a steel having the above composition, which steel is characterized by the fact that the toughness characteristics of the steel are improved by the addition of titanium (Ti) and boron (B), so that the Ti content is at least 3.4 times the amount of the concentration of nitrogen (N), and the B content is 0.001–0.005 wt. % of the total content.

Art hereby incorporated as reference includes German Patents No. 37 28 476 C1; No. 27 50 867 A1; No. 2,426,705; No. 1,962,279; 2,319,124; and 1,959,988 and U.S. Pat. Nos. 3,263,387 to Simpson; 3,868,796 to Bush: 3,938,288 to Roubinet and 3,964,208 to Renner.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A reinforcement tube for a motor vehicle door, said reinforcement tube comprising:
   a fully killed, steel alloy, said steel comprising iron and the following elements:

| | |
|---|---|
| 0.15–0.25% | Carbon |
| 3.40–6.10% | Manganese |
| 0–1.0% | Nickel |
| 0–1.0% | Chromium |
| 0–1.0% | Molybdenum |
| 0–0.15% | Vanadium |
| max. 0.03% | Phosphorous |
| max. 0.03% | Sulfur |
| max. 0.6% | Silicon |
| max. 0.05% | Aluminum such that a sum total | of the content of manganese, nickel, chromium and molybdenum, and ten times the vanadium content is greater than about 4.5 wt. % of the total percent of constituents of said alloy.

2. The reinforcement tube according to claim 1, wherein said reinforcement tube comprises a hot rolled steel alloy.

3. The reinforcement tube according to claim 2, wherein said steel alloy has a nitrogen content of up to approximately 70 ppm and said steel alloy further comprises:
   titanium additives; and
   boron additives;
   said titanium being in an amount at which the ratio of titanium content to the nitrogen content is less than 3.4 to 1; and
   said boron being in an amount at which the boron content is 0.001–0.005 wt. %.

4. The reinforcement tube according to claim 3, wherein said reinforcement tube comprises air-hardened steel alloy.

5. The reinforcement tube according to claim 4, wherein said reinforcement tube is hot-dip galvanized for corrosion protection of said reinforcement tube.

6. The reinforcement tube according to claim 5, wherein said reinforcement tube is for being welded into the motor vehicle door.

7. The door for a motor vehicle according to claim 3, wherein said steel alloy comprises greater than four and one-half percent of manganese and substantially zero percent of each of nickel, molybdenum, chromium and vanadium.

* * * * *

UNITED STATES PATENT AND TRADEMARK OFFICE
CERTIFICATE OF CORRECTION

PATENT NO. : 5,256,219
DATED : October 26, 1993
INVENTOR(S) : Ingo von HAGEN, Christoph PRASSER, and Enno WIETING Page 1 of 2

It is certified that error appears in the above-indentified patent and that said Letters Patent is hereby corrected as shown below:

On the title page, after item [63] insert the following Foreign Priority Data:
--[30] Foreign Application Priority Data
   October 26, 1989 [DE] Fed. Rep. of Germany
   P3935965--.

In column 2, in the second table, after line 61 insert the following new line in the table:
   --Remainder iron and usual impurities.--.

In column 3, line 49, after 'ten', delete "time" and insert --times--.

In column 4, line 13, in the equation, after 'Mo+', delete "1033 V" and insert --10 x V--.

In column 5, in the table, after line 54, insert the following new line in the table:
   --Remainder iron and usual impurities--.

UNITED STATES PATENT AND TRADEMARK OFFICE
CERTIFICATE OF CORRECTION

PATENT NO. : 5,256,219
DATED : October 26, 1993
INVENTOR(S) : Ingo von HAGEN, Christoph PRASSER, and Enno WIETING It is certified that error appears in the above-indentified patent and that said Letters Patent is hereby corrected as shown below:

In column 5, line 57, before 'as', delete "Remainder iron and usual impurities".

Signed and Sealed this

Tenth Day of June, 1997

Attest:

BRUCE LEHMAN

Attesting Officer

Commissioner of Patents and Trademarks